Jan. 5, 1971     H. SCHEMMANN     3,553,550
DEVICE FOR DERIVING A MEASURING VOLTAGE INDUCED
BY THE ROTOR OF AN ELECTRIC MOTOR
Filed April 17, 1969     2 Sheets-Sheet 1

INVENTOR.
HUGO SCHEMMANN
BY
AGENT

United States Patent Office 3,553,550
Patented Jan. 5, 1971

3,553,550
DEVICE FOR DERIVING A MEASURING VOLTAGE INDUCED BY THE ROTOR OF AN ELECTRIC MOTOR
Hugo Schemmann, Schaesberg, Netherlands, assignor to U.S. Philips Corporation, New York, N.Y., a corporation of Delaware
Filed Apr. 17, 1969, Ser. No. 816,914
Claims priority, application Germany, Apr. 30, 1968, 1,763,294
Int. Cl. H02k 29/00
U.S. Cl. 318—138
2 Claims

ABSTRACT OF THE DISCLOSURE

A permanent magnet synchronous motor is provided with energizing and feedback or measuring windings situated on the stator core and magnetically coupled. A transformer, having a primary winding connected in series with the energizing winding and a secondary winding connected in series with the measuring winding provides compensation for load dependent voltage variations induced in the measuring winding.

---

Figure 1:
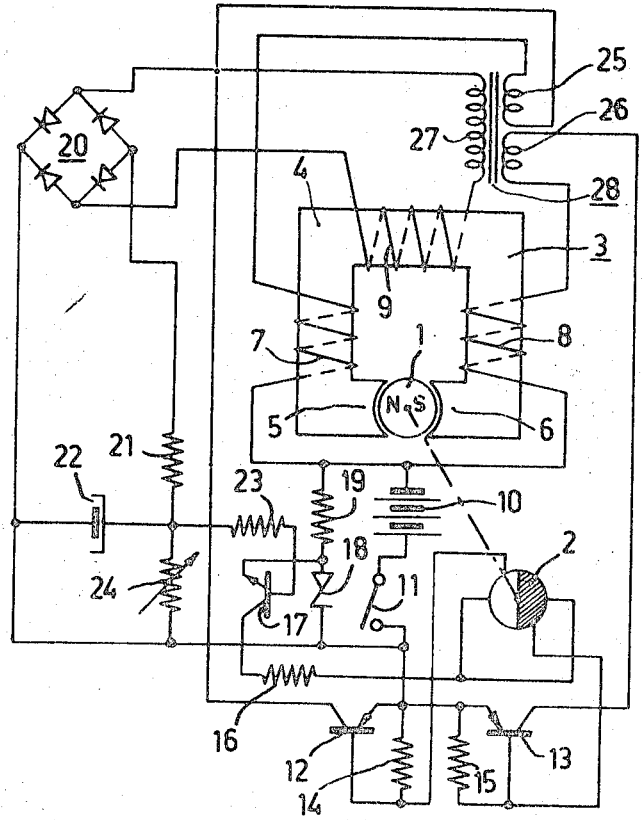

The invention relates to a static device for deriving a measuring voltage induced by the rotor of an electric motor having stator poles and at least one stator winding fed with alternating current, and dependent upon the speed of this rotor, the said device including at least one measuring winding surrounding the magnetic path between two poles of the stator.

In electric motors having a permanent-magnetic rotor and a speed which can be regulated, for example, electronically, the voltage $$e = w \frac{d\phi m}{dt}$$

induced in a measuring winding having $w$ turns by the rotating field of the rotor is frequently used as a quantity proportional to the speed. The frequency and the amplitude of this voltage are indeed proportional to the speed of the rotor, provided that, at the instant at which the voltage is derived, no current flows through the measuring winding used, and that this winding is not coupled with other windings through which a current flows, for example, the stator supply current, and that no saturation occurs in the entire combination.

Devices in which the voltage induced across the windings through which no current flows at the measuring instant is measured time and again are known. A geometrical construction of the motor in which the mutual magnetic coupling of the windings is equal to zero results in the pure E.M.F. being measured, which can then be used for governing the speed.

However, in most cases, in which an electric motor has several windings through which a current flows alternately, these windings are mounted on a common ferromagnetic armature. Their mutual magnetic coupling can have a high value and the magnetic fluxes through the various windings can be approximately equal to each other. Considerations of efficiency and of commutation often prevent a reduction of the mutual magnetic coupling of the various windings.

Consequently, in operation, the voltage across a winding of such a motor through which no current flows at the instant considered is not only the induced voltage produced by the movement of the rotor of the motor, but further includes also a load-dependent voltage $$L = \frac{di}{dt}$$

produced by the variations of the current in the other winding (or windings). Hence, the amplitude of the voltage produced across one of the motor windings or across an additional measuring winding depend upon the load of the motor and cannot be used as a control quantity, for example, for governing the motor speed. This applies in general to all cases in which a coupling of the measuring winding cannot be avoided.

It is an object of the present invention to remove this difficulty and to provide a cheap device of the aforementioned kind and adapted for use in many types of electric motors.

The device in accordance with the invention is characterized in that it includes at least one transformer having a primary winding connected in series with the stator winding and a secondary winding connected in series with the measuring winding, the winding directions and the ratio between the number of turns of these transformer windings being chosen such that the voltage induced in the measuring winding by the supply current flowing in the stator winding is compensated by at least part of the voltage induced in the secondary winding of the transformer by the supply current flowing in the primary winding of this transformer.

Generally a motor of the type having a permanent-magnetic rotor is provided with several, for example, two, stator windings. In this case the device preferably includes a transformer having at least two primary windings each connected in series with one of the stator windings magnetically coupled with the measuring winding, and one secondary winding connected in series with the measuring winding.

Figure 2:
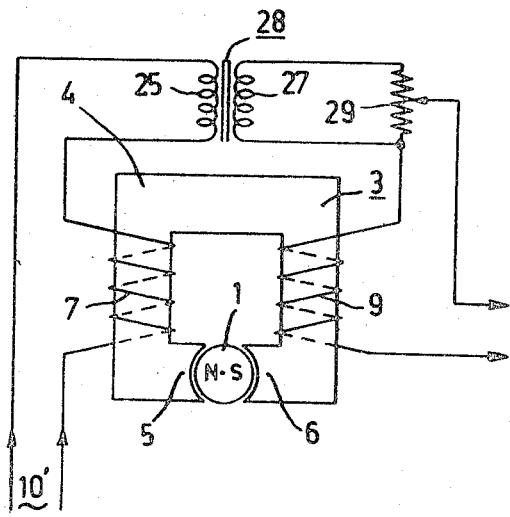
Figure 3:
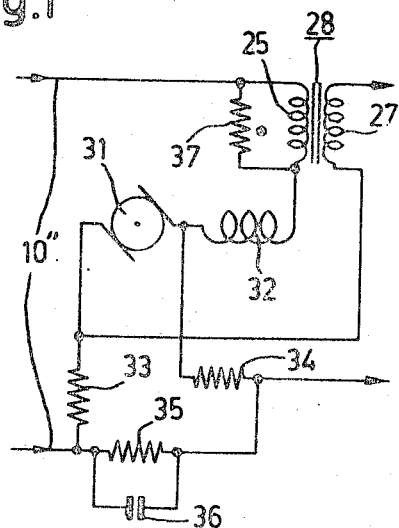
Figure 4:
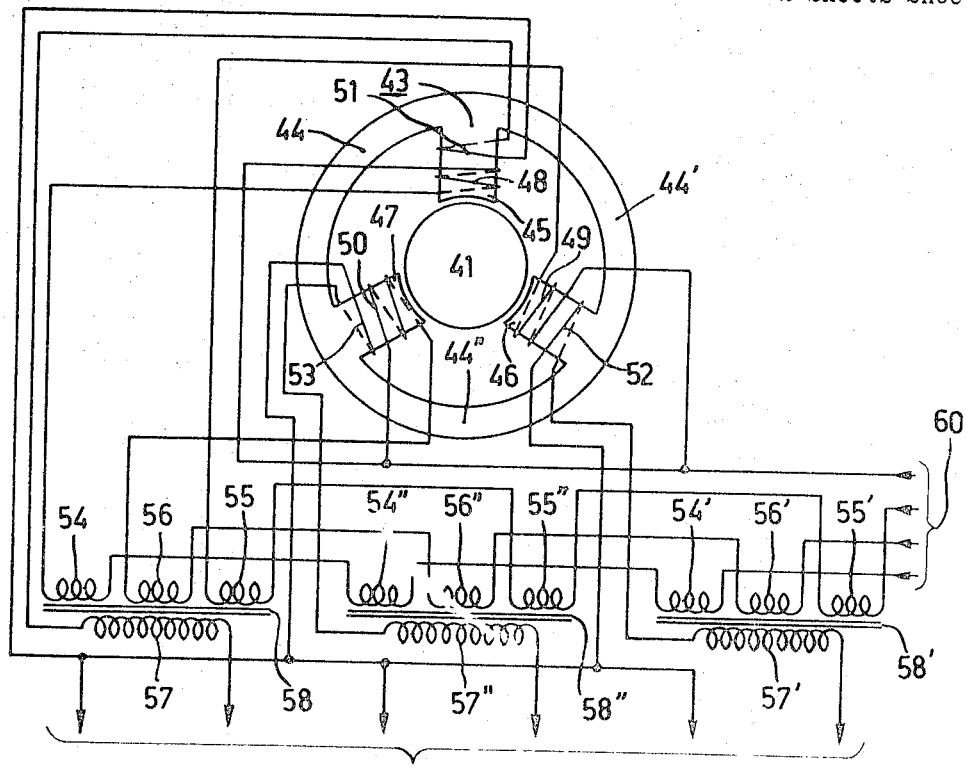
Figure 5:
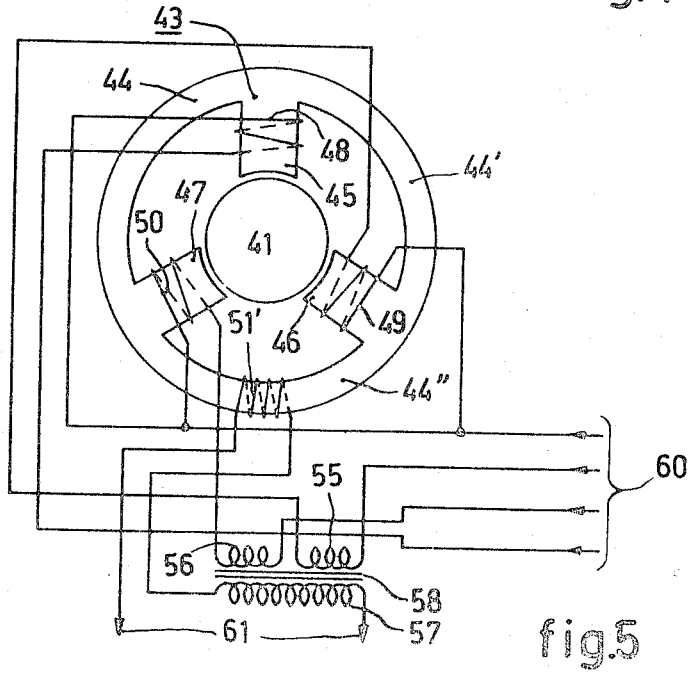

Features and advantages of the invention will appear from the following description of several embodiments thereof, given by way of example only, with reference to the accompanying drawings, in which:

FIG. 1 is a circuit diagram of a first embodiment of a device in accordance with the invention used in an electric motor provided with a permanent-magnetic rotor, FIG. 2 is a circuit diagram illustrating the principle of a modification of the embodiment shown in FIG. 1, FIG. 3 is a circuit diagram illustrating the principle of a second embodiment used in a commutator motor, FIG. 4 is a circuit diagram of a third embodiment used in a three-pole motor, and FIG. 5 is a circuit diagram of a simplified modification of the embodiment shown in FIG. 4.

Referring now to FIG. 1, the embodiment shown in this figure illustrates the use of the device according to the invention in a motor having a permanent-magnetic rotor 1. This motor furthermore comprises a commutator 2 driven by the rotor 1 and a ferromagnetic stator armature 3 having a yoke 4 and two poles 5 and 6 between which the rotor is rotatably mounted. The armature 3 carries three windings. Two energizing windings 7 and 8 are wound in the same direction and a measuring winding 9 is arranged between these two windings.

The energizing windings 7 and 8 are alternately fed by a direct-voltage source 10 through a make-and-break switch 11 and the emitter collector paths of p-n-p switching transistors 12 and 13, respectively, the bases of which are alternately polarized in the conductive direction through the commutator 2 in accordance with the position of the rotor 1. The bases of the transistors 12 and 13 are connected to their respective emitters through resistors 14 and 15, respectively, so that the transistors are normally cut off. However, they are also connected to different diametrically opposed brushes of the commutator 2 and are alternately coupled to a source of forward voltage through two other diametrically opposed brushes of this commutator, a base current limiting resistor 16 and the collector emitter path of an n-p-n transistor 17. The source of forward voltage comprises the series connection of a Zener diode 18 and a resistor 19 connected across the series connection of the direct-current source 10 and the switch 11.

The transistor 17 is controlled, through a base current limiting resistor 23, by the difference voltage occurring between the voltage across the Zener diode 18, which also serves as a reference voltage source, and the rectified and smoothed voltage set up across the measuring winding 9. The latter winding is connected to the input terminals of a diode bridge 20, the output terminals of which are connected through a smoothing resistor 21 to the terminals of a smoothing capacitor 22. The positive terminal of the capacitor is connected to the emitters of the transistors 12 and 13 and to the positive terminal of the Zener diode 18 and the negative terminal of the capacitor is connected to the base of the transistor 17 through the resistor 23.

Such devices including a motor having a permanent-magnetic rotor are known, at least in principle.

The voltage $V_9$ produced across the measuring winding 9 contains a component $$w_9 \frac{d\phi_1}{dt}$$

the amplitude and frequency of which increase with the back E.M.F. and hence with the speed of this rotor. When the direct voltage $V_{22}$ produced by this voltage across the capacitor 22 exceeds, or equals the reference voltage $V_{18}$ across the Zener diode 18, no forward current is supplied to the base of the transistor 17. Consequently, this transistor is cut off, so that no forward current can flow to the base of the transistor 12 or 13 and these transistors remain cut off. As a result, the speed of the rotor 1 is stabilized at a value at which the amplitude and the frequency of $V_9$ are such that $V_{22}$ remains slightly smaller than $V_{18}$. This value may be adjusted, for example, by varying the value of a resistor 24 connected in parallel with the capacitor 22.

The measuring winding 9 is magnetically tightly coupled with the energizing windings 7 and 8 so that the voltage $V_9$ across this winding contains, in addition to the said voltage component the amplitude and frequency of which are proportional to the back E.M.F. produced in the measuring winding by the rotating rotor 1, a second voltage component of the same frequency:

$$\frac{w_9}{w_8} \cdot L_8 \frac{di_8}{dt} \text{ or } \frac{w_9}{w_7} \cdot L_7 \frac{di_7}{dt}$$

the amplitude of which increases with that of the current $i_7$ or $i_8$ in the windings 7 and 8, respectively. However, this second component depends upon the voltage supplied by the source 10 and upon the motor load, i.e. on the torque delivered by the rotor 1. As a result, the speed of the rotor 1 is stabilized at the adjusted value only for a given driving (or braking) torque. In most cases this is not sufficient and is felt as a great disadvantage.

In order to eliminate the influence of the second component of the voltage $V_9$, the device in accordance with the invention includes a compensating transformer 28. This transformer, which is comparatively small but is preferably not driven into saturation, comprises two identical primary windings 25 and 26 which are connected in the same direction in series with the energizing windings 7 and 8, respectively, and a secondary winding 27 connected in series with the measuring winding 9.

The transformer 28 superimposes a voltage $$V_{27} = \frac{w_{27}}{w_{26}} \cdot L_{26} \frac{di_8}{dt}$$

upon the voltage $$V_9 = -w_9 \frac{d\phi_1}{dt} - \frac{w_9}{w_8} L_8 \frac{di_8}{dt}$$

and the numbers of turns of the windings 25, 26 and 27 and the inductance values of the primary windings 25 and 26 can be chosen such that $V_{27}$ compensates the second component of the voltage $V_9$:

$$\frac{w_{27}}{w_{26}} \cdot L_{26} \frac{di_8}{dt} = \frac{w_9 L_8 di_8}{w_8 dt}$$

and $$\frac{w_{27}}{w_{25}} \cdot L_{25} \frac{di_7}{dt} = \frac{w_9 L_7}{w_7} \frac{di_7}{dt}$$

so that $$V_9 + V_{27} = -w_9 \frac{d\phi_1}{dt}$$

whereby the speed of rotation of the rotor 1 is stabilized so as to be substantially independent of the supply voltage and of the load, within given permissible limits. In practice the voltage $V_{27}$ is preferably adjusted, for example, by varying the number of turns $w_{27}$ of the secondary winding 27 with a stationary (arrested) rotor 1 and by artificial commutation, for example, by means of a square-wave voltage generator. Under these conditions the voltage $V_{20}$ at the input of the rectifier 20 must be equal to zero.

FIG. 2 shows a modification of the device of FIG. 1. The motor again includes a permanent-magnetic rotor 1 and a stator comprising an armature 3, a yoke 4 and poles 5 and 6. However, this armature carries only one energizing winding 7 and a measuring winding 9. The energizing winding 7 is fed by an alternating voltage source 10', with a current the frequency of which varies directly as the speed of the rotor 1. This may be achieved, for example, by connecting the transistors 12 and 13 of FIG. 1 to the centre-tapped primary winding of an output transformer, the secondary winding of which is connected to the energizing winding 7 and thus forms the source 10', instead of letting these transistors directly supply alternately two energizing windings.

In this modification the transformer 28 has only one primary winding 25 which is connected in series with the energizing winding 7. The compensating transformer again has a secondary winding 27 connected in series with the measuring winding 9. The winding 27 is connected in parallel with a potentiometer 29, enabling the compensating voltage $V_{27}$ to be readily adjusted.

In the second embodiment shown in FIG. 3 the device is used in a commutator motor having a wound rotor 31 which is fed through brushes by an alternating-voltage source 10'' and is connected in series with a field energizing winding 32. In motors of this type, a back E.M.F. is produced across the rotor winding when the rotor is revolving. The motor winding thus also fulfils the function of a measuring winding. Owing to the commutation, this back E.M.F. is a voltage proportional to the speed of the rotor 1 and of the same frequency as the supply voltage. A voltage drop $$R_{31} \cdot I_{31} + L_{31} \frac{di_{31}}{dt}$$

is superimposed on this back E.M.F. by the rotor. This voltage drop can be neutralized, for example, in the manner described in Mullard Technical Communications of November 1966, pp. 86–89, a small balancing resistor 33 is connected in the manner shown in FIG. 3, in series with the rotor 31. A second bridge arm comprising the series connection of a resistor 34 and of the parallel connection of a resistor 35 and a capacitor 36 is connected across the series connection of the rotor 31 and the resistor 33. This results in a voltage $V_{31}$ proportional to the back E.M.F. being produced between the tapping on the second bridge arm and the junction of the rotor 31 and the resistor 33. If the motor is of the shunt type or is energized by a permanent magnet, the back E.M.F. and hence the voltage $V_{31}$ will be independent of the load and, in the case of permanent-magnet energization, of the supply voltage also.

However, in a series-type motor and to a lesser degree in a compound-type motor, the field and consequently the back E.M.F. and the measuring voltage $V_{31}$ increase with the load and the supply voltage.

In the device shown the motor 31, 32 is of the series type and the said increase is compensated for by means of a compensating transformer 28 which has a primary winding 25 connected in series with the self-energizing winding 32 and a secondary winding 27 connected in series with the output of the double bridge 31, 33–36. At the output of the latter series connection, a measuring voltage is then produced which is proportional to the speed of the rotor 31 and corresponds to the back E.M.F. which would be produced at the speed considered and with an unloaded motor. With unloaded motor, the compensating transformer 28 can be rendered inoperative, for example, by short-circuiting its primary winding 25 by means of a resistor 37 having a high positive temperature coefficient and a sharp current threshold.

The invention may also be used with a motor having more than two stator poles, and FIG. 4 shows an embodiment in which the motor has three stator poles.

The motor includes a rotor 41 and a stator armature 43 having yoke parts 44, 44' and 44" and poles 45, 46 and 47 carrying stator windings 48, 49 and 50 respectively. The device comprises three measuring windings 51, 52 and 53 provided on the poles 45, 46 and 47, respectively, and three compensating transformers 58, 58', and 58" each having three primary windings 54, 55, 56; 54' 55', 56'; 54", 55" and 56", and one secondary winding 57, 57', 57", respectively.

The stator windings 48, 49 and 50 are star-connected to a three-phase supply source 60 through the primary windings 54, 54', 54"; 55, 55', 55"; 56, 56', 56", respectively, of the compensating transformers 58, 58' and 58".

The measuring windings 51, 52 and 53 are also star-connected and are each connected to output terminals 61 through the secondary windings 57, 57' and 57" of the associated compensating transformer 58, 58', 58", respectively.

The winding-directions and the ratios between the respective numbers of turns of the primary and secondary windings of each compensating transformer are again chosen such that the voltage induced in each of the measuring windings by the supply current flowing through the stator winding is compensated by the voltage induced in the secondary windings of the associated compensating transformers by the current flowing through the primary windings of these transformers.

As in the first embodiment, the rotor 41 can again be a permanent-magnetic rotor, the supply source 60 being constituted by a direct voltage source commutated in accordance with the changes in position of the rotor 41 or by a three-phase alternating-voltage source controlled in accordance with these changes. A three-phase alternating voltage the amplitude and frequency of which are proportional to the speed of the rotor 41 is thus produced, as a measuring voltage, at the output terminals 61.

The rotor 41 can alternatively be provided with a three-phase winding fed through brushes and connected in series with the stator windings 48, 49 and 50, for example, these windings and the star point (upper conductor) of the stator windings being connected to a supply voltage source 60, for example, in the form of a three-phase alternating-voltage supply. The frequency of the measuring voltage produced at the output terminals 61 is then equal to the supply frequency, and its amplitude is proportional to the speed of the rotor 41, as is the case in the embodiment shown in FIG. 3.

Finally, the motor 41, 43 can be an induction motor, the rotor being, for example, a squirrel-cage rotor and the supply source 60 being a three-phase alternating-voltage supply. The frequency of the measuring voltage produced at the output terminals 61 is then again equal to that of the supply means and its amplitude is proportional to the slip of the rotor 41, i.e. equal to a maximum value with a stationary (for example, arrested) rotor and equal to zero with the rotor rotating at the synchronous speed.

In all cases, a three-phase bridge rectifier can be connected to the output terminals 61 to produce a direct voltage that is dependent upon the speed of the rotor 41.

FIG. 5 shows a greatly simplified modification of the embodiment shown in FIG. 4. At comparatively high speeds and/or supply frequencies, a single-phase measuring voltage is generally sufficient. The device then only has a single measuring winding 51' which can be arranged, for example, on the yoke part 44" and consequently surrounds the magnetic path between the stator poles 46 and 47.

The magnetic flux of the third stator coil 45 is closed through the yoke part 44, the pole 47 and the rotor 41 and also through the yoke part 44', the pole 46 and the rotor 41, so that the flux through the measuring winding 51' is not, or at least not directly, influenced by the current passing through the winding 48. However, this flux is directly influenced by the currents passing through the windings 49 and 50, and the compensating transformer 58 is thus provided with two primary windings 55 and 56 connected in series with the stator windings 49 and 50, respectively.

The secondary winding 57 of this transformer is again connected in series with the measuring winding 51'.

Summarizing, it can be said that the device in accordance with the invention can be used to particular advantage in motors having permanent-magnetic rotors. The device is reliable and cheap as compared with an otherwise necessary tachometer generator. It provides a measuring voltage the frequency and amplitude of which are proportional to the rotor speed.

In commutator motors the device can only be used to advantage in motors of the series type or of the compound type. In these cases, the rotor winding can also be used as the measuring winding because the back E.M.F. produced across the rotor can readily be derived and has an amplitude proportional to the product of the speed and the energizing field. In this event, the inductance of the stator winding or windings must be entirely, or substantially entirely, independent of the position of the rotor, that is to say, the commutator motor must be provided with a rotor having no magnetical core or having a large number of commutator lamination. In the case of only small variations of the inductance of the stator winding, the voltage drop across the stator can then be compensated for by the transformer with constant inductance, the device producing a voltage of the same form and frequency as the supply voltage and the amplitude of which is proportional to the motor speed.

In asychronous motors and other induction motors, the device in accordance with the invention can also be used, although frequently, especially in the case of comparatively large motors, a tachometer generator will preferably be used. When used in a synchronous motor, the device delivers a voltage of the same frequency as the supply voltage having an amplitude proportional to the difference between the synchronous speed and the actual speed.

As has been described with reference to the drawings, the device in accordance with the invention can be used in many types of electric motors to produce, by static means a measuring voltage dependent upon the rotor speed thereby eliminating a separate tachometer generator driven by the rotor. This solution is of advantage when the compensating transformer, together with the measuring winding and, as the case may be, with a rectifier and a smoothing filter is smaller, lighter and cheaper than a tachometer generator, i.e. especially in small and very small electric motors.

What is claimed is:

1. A static device for deriving a measuring voltage dependent upon the rotor speed of an electric motor having stator poles and at least one stator winding fed with alternating current comprising, at least one measuring winding surrounding the magnetic path between two poles of the stator, at least one transformer having a primary winding connected in series with the stator winding and a secondary winding connected in series with the measuring winding, the widing directions and the ratios between the respective numbers of turns of these transformer windings being chosen such that the voltage induced in the measuring winding by the supply current flowing in the stator winding is compensated by at least part of the voltage induced in the secondary winding of the transformer by the supply current flowing in the primary winding of this transformer.

2. A device as claimed in claim 1 for use in a motor provided with several stator windings, wherein said transformer includes at least two primary windings each connected in series with one of the stator windings magnetically coupled with the measuring winding, and one secondary winding connected in series with the measuring winding.

References Cited

UNITED STATES PATENTS 3,302,083   1/1967   Tanaka et al. _____ 318—138

ORIS L. RADER, Primary Examiner

G. Z. RUBINSON, Assistant Examiner

U.S. Cl. X.R.

318—171, 227, 230

PO-1050
(5/69)

UNITED STATES PATENT OFFICE
CERTIFICATE OF CORRECTION

Patent No. 3,553,550     Dated January 5, 1971

Inventor(s) HUGO SCHEMMANN

It is certified that error appears in the above-identified patent and that said Letters Patent are hereby corrected as shown below:

Column 1, line 10, cancel "1,763,294" and insert -- P.1763294.9 --;

Signed and sealed this 13th day of April 1971.

(SEAL)
Attest:

EDWARD M. FLETCHER, JR.  
Attesting Officer

WILLIAM E. SCHUYLE  
Commissioner of Pa